United States Patent Office 3,495,990
Patented Feb. 17, 1970

3,495,990
AERATED FOOD PRODUCTS
Lowell N. Kayser, Minneapolis, Minn., assignor to The Pillsbury Company, Minneapolis, Minn., a corporation of Delaware
No Drawing. Filed Mar. 2, 1967, Ser. No. 619,963
Int. Cl. A23g; A23l 1/00
U.S. Cl. 99—139                    14 Claims

ABSTRACT OF THE DISCLOSURE

Aerated food products of a smooth, creamy consistency having syneresis resistance are provided by an edible, homogeneous emulsion which in addition to fat and water contains a relatively small amount of water-soluble polysaccharide which structurally consists essentially of a polymeric chain of D-glucopyranose units contiguously attached to one another by a beta 1,3 linkage with appendant D-glucopyranose groups being attached to the polymeric chain through a beta 1,6 linkage. The emulsion may also contain sweetening agents, surface active agents and other edible ingredients.

---

This invention relates to an aerated food product of a smooth, creamy consistency. More particularly, the invention relates to an edible emulsion cotaiing a polysaccharide which is adapted to provide upon aeration a product of a consistency similar to that of whipped cream.

Conventionally, aqueous emulsions containing proteinaceous materials and triglyceride fat have been employed to provide aerated food products. Notwithstanding economical considerations, the art has long recognized the difficulties in providing aerated food products from aqueous emulsions containing proteinaceous materials (e.g., whipping cream). These difficulties are primarily due to inherent properties of the proteinaceous containing aqueous emulsions and the properties of the whipped product thereof. In general, these products are not stable unless properly refrigerated. Failure to maintain proper refrigeration conditions (e.g., freezing or elevated temperature exposure) will result in destruction of the whipping characteristics thereof. Denaturization of the proteinaceous material and actual breaking of the emulsion principally contribute to this lack of whipping character. However, even if proper refrigeration is maintained, these products are inherently susceptible to degradation upon aging. The actual whipping step also presents a problem to the ultimate consumer in that slight differences in whipping conditions provide substantial difference in the character of the ultimate whipped product. In addition, such proteinaceous products are not compatible with acidic food adjuncts (e.g., fruits).

Similar to the emulsion per se the whipped product from equeous emulsion containing proteinaceous materials possesses undesirable properties from a consumer's viewpoint. Primarily, these problems are related to stability of the whipped product. If the whipped product is consumed shortly after its preparation, it is usually acceptable. Upon standing or aging, however, the product readily loses its whipped character (e.g., breakdown of the foamed structure, entrained gas loss, syneresis, etc.).

United States Patent No. 2,868,653 by H. W. Diamond et al., is representative of the art's attempt to provide a synthetic cream product which does not rely upon the presence of proteinaceous material to provide a foamed structure. In addition to triglyceride fat, water and an emulsifier, the synthetic cream contains an alkyl cellulose (e.g., methyl ethyl cellulose) in an amount of about 2 to about 3 parts by weight cellulose for each 100 parts by weight water. Such a synthetic cream may be employed in combination with acidic food adjuncts. Although the product provides greater stability against aging and may be stored under frigid conditions, the employment of refrigerated conditions or lower temperatures are deemed essential to maintain stability of the synthetic cream. Like whipping cream, the synthetic cream product is dependent upon the employment of relatively low temperatures for the aeration thereof (e.g., about 50° F. or less). The whipped synthetic cream product is more stable against loss of entrained gas and general breakdown of the foam structure than cream. The product, however, is susceptible to syneresis when stored for a relatively short period of time (e.g., 2 to 3 hours).

An object of the present invention is to provide an edible emulsion adapted to be whipped with an inert gas to form a firm nonpourable mass by the retention of ingested gas.

Another object of the invention is to provide an edible emulsion which possesses enhanced stability and tolerance.

An additional object of the present invention is to provide an aerated food product which possesses enhanced stability against syneresis.

An additional object of the present invention is to provide an edible emulsion adapted to be aerated at temperatures substantially above that normally employed for whipping cream.

According to the present invention there is provided an edible emulsion adapted to provide an aerated food product of a smooth, creamy consistency, said emulsion comprising 100 parts by weight water and a water-soluble polysaccharide consisting essentially of a polymeric chain of D-glucopyranose units contiguously attached to one another by a beta 1,3 linkage to form a polymeric chain, said polymeric chain having appendant D-glucopyranose groups contiguously attached to the polymeric chain through a beta 1,6 linkage, said polysaccharide being present in the emulsion in amount ranging from about 0.01 to less than 0.5 part by weight polysaccharide for each 100 parts by weight water, said emulsion containing in addition to the polysaccharide and water, a glyceride fat in an amount ranging from about 25 to about 100 parts by weight for each 100 parts by weight water.

The edible emulsion, described herein, can be stored under aseptic and non-refrigerated conditions for a substantial period of time. High overrun (i.e., a high degree of ingestion of air) and greater tolerance to elevated whipping temperatures (e.g., 70° F.) are provided by the disclosed edible emulsion. The aerated, cream-like products prepared from the edible emulsion are stable against shrinkage, weepage and general deformation for substantial periods of time even though the aerated products are subjected to ambient conditions.

The polysaccharides applicable to the present edible emulsions are characterized as having a polymeric chain consisting essentially of the following units:

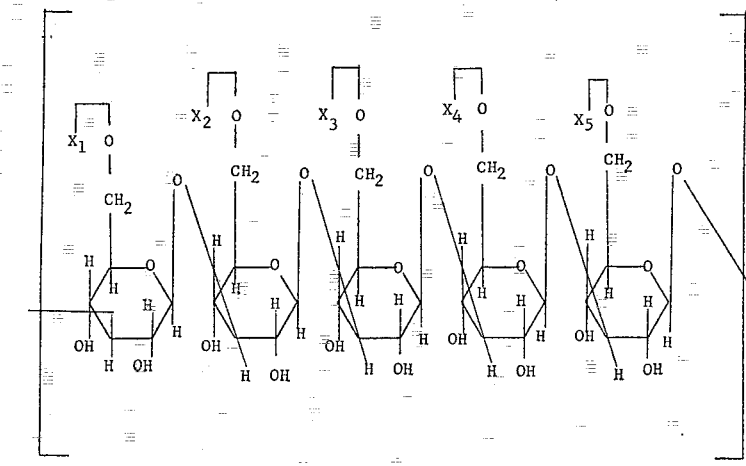

wherein $X_1$, $X_2$, $X_3$, $X_4$ and $X_5$ are hydrogen or a glucopyranose unit having the structure:

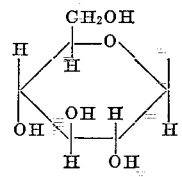

In the aforementioned polymeric chain, the degree of substitution is such that at least one member of $X_1$, $X_2$, $X_3$, $X_4$ and $X_5$ is a D-glucopyranose group. In general, $n$ is an integer sufficient to provide a polysaccharide having an average molecular weight of at least 19,000 and usually greater than 50,000. Polysaccharides having the aforementioned polymeric chain of beta 1,3 D-glucopyranose units and appendant 1,6 D-glucopyranose groups and the manner of preparing the polysaccharides are generally disclosed in United States Patent No. 3,301,848 by Frank E. Halleck. Additional polysaccharides having the aforementioned characteristic structure include the polysaccharide product derived from the fermentation of Plectania occidentalis NRRL 3137 disclosed by L. N. Wallen et al., in Applied Microbiology, 13,272 (1965). An illustrative adaptable polysaccharide is one which has a degree of substitution of appendant groups ranging from about 25 percent to about 75 percent (i.e., about 1 out of 4 to about 3 of 4 of the beta 1,3 D-glucopyranose units have an appendant beta 1,6 D-glucopyranose group). The polysaccharides employed herein are water soluble.

Based upon 100 parts by weight of water, the amount of polysaccharide employed in the edible emulsion ranges from about 0.01 to less than 0.5 part by weight polysaccharide. Advantageously, an amount of polysaccharide ranging from about 0.05 to about 0.4 part by weight for each 100 parts by weight water is employed. Products of exceptional whipping characteristics and stability are provided when the ratio of polysaccharide to water ranges from about 0.10 to about 0.3 part by weight polysaccharide for each 100 parts by weight water and the polysaccharide has a degree of substitution ranging from about 30 percent to about 40 percent.

In addition to facilitating the whipping character of the emulsion, the polysaccharide effectively prevents creaming in the aqueous emulsion and syneresis in the whipped product prepared therefrom. The absence of aerated product syneresis is especially noticeable when the products are frozen and subsequently unfrozen (i.e., freeze-thaw conditions). In the absence of an abnormally high level of surface active agents, the polysaccharide, in relatively low amounts as expressed herein, permit the incorporation of a high fat to water ratio in an emulsified state. The whipped products do not exhibit weeping, break down or formation of a tough crust after 40 hours of refrigeration.

Triglyceride fats include animal and vegetable fats which are normally solid at room temperature such as butter, cocoa butter, hydrogenated vegetable oils (e.g., hydrogenated cottonseed, corn, coconut, peanut, palm, safflower, soy bean oils), mixtures thereof and the like. Relatively high melting fats having a melting point ranging from about 85° F. to about 120° F. (Wiley) and possessing a relatively low iodine value (e.g., less than about 100 and preferably less than about 75) enhance the mouthfeel and stability of the resultant product. Advantageously, there is employed a triglyceride fat having a melting point of about 90° F. to about 110° F. in an amount ranging from about 25 to about 100 parts by weight for each 100 parts by weight water. Exceptional edible emulsions adapted to provide an aerated product are provided when about 35 to about 80 parts by weight fat having a Wiley melting point of about 95° F. to about 105° F. are employed for each 100 parts by weight water.

In order to impart sweetness to the edible emulsion and the aerated products prepared therefrom, it is desirable, but not necessary, to provide therein at least one sweetening agent. The amount of added sweetening agent will depend primarily upon the sweetening power of the sweetening agent employed. The sweetening agent may be a sugar or of a non-sugar type and mixture thereof. Illustrative sugars include sucrose, lactose, dextrose, etc., in amounts ranging from about 10 to about 200 parts by weight for each 100 parts by weight in the aerated product and about 10 to about 150 parts by weight sugar for each 100 parts by weight water in the emulsion. Non-sugar sweetening agents include sorbital, mannitol and those sweetening agents identified in the art as artificial sweetening agents. Typical artificial sweeteners are saccharine and salts thereof such as sodium, potassium, calcium and ammonium saccharine and the cyclamic acid sweeteners (e.g., cyclohexylsulfamic acid, the salts thereof such as sodium, potassium and ammonium cyclamate, the lower alkyl glycine esters of cyclohexylsulfamic acid like the methyl and ethyl glycine esters of cyclohexylsulfamic acid. When the artificial sweeteners are employed as the sole sweetening agent, the polysaccharide in combination with the fat provides the necessary texture and mouthfeel without necessitating the employment of other bodying agents.

In general, typical amounts of artificial sweeteners range from about 0.025 to about 6 parts by weight for each 100 parts by weight with a preferred range of a cyclamate and saccharine blend (e.g., 12:1) being about 0.1 to about 3.0 parts by weight artificial sweetener for each 100 parts by weight water.

Whipping characteristics and texture of the whipped product are enhanced by the incorporation of an edible surface active agent or mixture thereof into the aqueous emulsion. The amount of surface active agent employed and the effectiveness thereof will depend upon the properties thereof. Suitable surface active agents include the partial fatty acid esters of glyceryl having at least one fatty ester group containing from 12 to 22 carbon atoms atoms, the partial esters of fatty acids (e.g., 12 to 22 carbon atoms) and hexitol anhydrides, the polyoxyalkylene derivatives of partial esters of edible glycols and a higher saturated fatty acids (e.g., $C_{12}$ to $C_{22}$) and other surface active agents as well as mixtures thereof. Partial fatty acid esters of glyceryl having at least one fatty ester group are the mono- and diglycerides such as glycerol monostearate, glycerol monooleate, glycerol monopalmitate, glycerol monolaurate, glycerol monomyristate, glycerol monobehenate, glycerol monopentadecanate, glycerol distearate, glycerol dipalmitate, glycerol dilaurate, glycerol monostearate monopalmitate, glycerol dibehenate, glycerol dimyristate, glycerol monostearate monoethanoate, glycerol monopalmitate monopropionate, glycerol monostearate monovalerate, glycerol monolaurate monocaprate, glycerol monomyristate monocaprate, acetylated monoglycerides (e.g., acetylated glycerol monostearate, acetylated glycerol monooleate, acetylated monopalmitate, etc.), the glyceryl-lacto esters of fatty acids such as glycerol lacto oleate, glyceryl lacto-monopalmitate, partial esters of fatty acids include surface active agents such as propylene glycol monostearate, propylene glycol monopalmitate, propylene glycol monolaurate, propylene glycol monomyristate, etc.

Edible partial esters of the fatty acids and hexitol anhydride (e.g., the hextans and hexides) include the reaction products of the fatty acids (preferably the fatty acids having between 16 and 18 carbon atoms) and the hexitol anhydrides such as the partial fatty acid esters of sorbide and sorbitan acid esters, the partial monomannitan and mannide fatty acid esters, and the galactitan and galactide fatty acid esters, mixtures thereof and the like. Illustrative partial esters of the fatty acids and hexitol anhydrides include mannitan di- and monopalmitates, mannitan mono- and distearates, mannitan mono- and dilaurates, mannitan- and dioleates, mannitan monopalmitate monostearate, mannitan mono- and dimyristates, mannitan tristearate, mannitan monobehenate, sorbide monolaurate, sorbide monooleate, sorbide monopalmitate, sorbide monobehenate, sorbide monostearate, sorbide distearate, galactitan monostearate and distearate, galacitan monolaurate, galactitan monobehenate, galactide mono, and distearates the sorbitan fatty acid esters, mixtures thereof and the like. Preferably employed as the partial esters of the fatty acids and hexitol anhydrides are the sorbitan fatty esters. Typical sorbitan fatty esters are those sorbitan fatty esters that have at least one fatty acid group containing from 12 to 22 carbon atoms and include sorbitan monostearate, sorbitan monopalmitate, sorbitan distearate, sorbitan dipalmitate, sorbitan monooleate, sorbitan dioleate, sorbitan dilaurate, sorbitan monolaurate, sorbitan monomyristate, sorbitan dimyristate, sorbitan tristearate, sorbitan monopropionate monostearate, mixtures thereof and the like.

Typical polyoxyalkylene derivatives of partial esters of fatty acids and hexitol anhydrides include polyoxyethylene (20) sorbitan monostearate, polyoxypropylene (20) sorbitan monostearate, polyoxyethylene (20) sorbitan tristearate, polyoxyethylene (5) sorbitan distearate, polyoxyethylene (15) mannitan monopalmitate, polyoxyethylene (10) mannitan dimyristate, polyoxyethylene (20) sorbitan dioleate, polyoxyethylene (20) sorbitan monooleate, polyoxypropylene (20) sorbitan monooleate, polyoxyethylene (20) galactitan monostearate, polyoxyethylene (20) galactitan dioleate and polyoxyethylene (30) sorbitan monostearate. Additional surface active agents include sucrose monostearate, lecithin, hydroxylated lecithin, etc. Since the aqueous emulsion is stable under acid conditions, the fatty acids may also be employed as surface active agents.

Various other conventional ingredients in quantities and proportions commonly added to whippable edible emulsions such as color and flavor additives, texturizers, nutrient supplements, preservatives, edible acidulents, thickeners and the like may be included, depending upon the ultimate desired product.

The edible emulsion may be prepared by dry blending the polysaccharide and sweetening agent (if employed) and adding the blend to hot water (e.g., 160° F.) in desired proportions to provide a polysaccharide containing solution. Molten fat (e.g., 160° F.) is then slowly admixed and dispersed into the hot polysaccharide solution. The resultant mixture is then homogenized, cooled to about room temperature and packaged for distribution.

The emulsion is adapted for distribution in a number of different ways. The emulsion may be distributed in a refrigerated or non-refrigerated form. By omitting a portion of the water, it can be made in concentrated form and packaged with the ultimate consumer subsequently adding water thereto. By employing aseptic processing and sterilizing conditions, the emulsion can be packaged in an aseptic container and distributed to the ultimate consumer in a non-refrigerated form. The emulsion may also be aerated by mechanical whipping means of a non-toxic edible gas (e.g., nitrogen oxide, carbon dioxide, etc.) and packaged in a pressurized container. The emulsion may also be provided in the dehydrated form (e.g., a spray-dried product containing about 3 to about 6 percent by weight water) with the ultimate consumer providing sufficient water and mixing of reconstitute the emulsion.

The following examples are illustrative of the invention:

EXAMPLE I (A) Preparation of the aqueous emulsions

Ten pounds of granulated sucrose and 0.15 pound of a polysaccharide, prepared in accordance with the teachings of Example I of U.S. Patent No. 3,301,848 and employing *Sclerotium rolfsii* Barnett American Type Culture Collection No. 15206 as the polysaccharide producing microorganisms, were dry blended in a conventional Hobart mixer. The polysaccharide possessed the properties disclosed in column 13, lines 39–75 of U.S. Patent No. 3,301,848. The blended polysaccharide and sugar were then dissolved in 55 pounds of hot water (160° F.). A molten fat phase consisting of 17.2 pounds of a first hydrogenated cottonseed oil having a Wiley melting point of 93±2° F. and a solid fat index at 50° F. of 27±3 at 70° F. of 15±3 at 80° F. of 10±2 and at 92° F. of less than 5 percent; 17.2 pounds of a second hydrogenated cottonseed oil having a Wiley melting point of 97° F.±2° F. and solid fat index as follows: at 50° F. of 72±3 percent; at 70° F. of 65±3 percent; at 80° F. of 58±3 percent; at 92° F. of 22±3 and 100° F. of 0; 0.40 pound of a polyoxyethylene (20) sorbitan tristearate and 0.05 pound of a distilled acetylated monoglyceride [1] was prepared by agitating and heating the fat phase to 160° F. The molten fat phase was slowly added to the water base (at 160° F.) with moderate agitation and the mixture was maintained at 160° F. for about 5 minutes after the addition of fat. The resultant mixture was then homogenized with a two-stage homogenizer with the first stage operated at 1500 p.s.i. and the second stage at 500 p.s.i. After homogenization, the resultant aqueous emulsion was cooled in an ice bath to about 75° F. and maintained at 75° F. for 12 hours and then refrigerated to about 45° C.

(B) Emulsion character

The aqueous emulsion can be stored at 35° F. to 45° F. for 90 days with no observable creaming. Eight ounces of the emulsion was aerated in a 3 quart bowl and a Hobart N–50 mixer equipped with a wire whip operated at speed 2 for 2 minutes. The resultant whipped product was stable against syneresis (e.g., storage at 35° F. to 45°

---

[1] A distilled acetylated monoglyceride identified under the trade name of "Myvacet 5–70" and distributed by Distillation Products Industries.

F. for 48 hours) and exhibited freeze-thaw stability (e.g., −10° F. for 12 hours and thawed to 75° F. with no evidence of syneresis. The whipped product did not weep, break down or form a tough crust, after 40 hours of refrigeration. Overrun for the whipped product was about 200 percent. The whipped product was of a smooth, creamy consistency very similar to that of whipped cream which had been whipped to a stiff peak in a manner hereinafter described. On tests designed to illustrate the emulsion stability against acidic conditions, 8 ounces of the emulsion was added to 4 ounces of the pineapple juice concentrate and the product was whipped as hereinbefore described. The acid containing whipped product was stable against syneresis for at least 24 hours. Aerated products of a frosting consistency were prepared by adding 150 grams of powdered sucrose to 400 grams of the aqueous emulsion and 300 grams of powdered sucrose to another 400 gram portions of the aqueous emulsion and aerating the products in the manner for the previously mentioned whipped product. The product containing the additional 150 grams of sugar was fluffy and that containing the 300 grams of sugar was creamy.

EXAMPLE II

Employing the manner of preparation of Example IA, an aqueous emulsion containing the following ingredients was prepared:

| Ingredients: | Percent by weight |
|---|---|
| Hydrogenated cottonseed oil [2] | 12.70 |
| Hydrogenated cottonseed oil [3] | 12.70 |
| Polyoxyethylene (20) sorbitan tristearate | 0.40 |
| Distilled acetylated monoglycerides | 0.05 |
| Sugar | 12.00 |
| Water | 62.00 |
| Polysaccharide [4] | 0.15 |

[2] The first hydrogenated oil described in Example I.
[3] The second hydrogenated oil described in Example I.
[4] Described in Example I.

For comparative purposes, a commercially available frozen aqueous emulsion containing methyl ethyl cellulose was tested against the aforementioned polysaccharide containing emulsion. The commercially available frozen aqueous emulsion contained approximately the same water to fat ratio.

Employing a standard household mixing bowl and mixer operated at a whipping speed for one minute under ambient conditions, aerated products were prepared from the above emulsions. The table sets forth the comparative differences of the resultant products whipped at 50° F., 65° F., 70° F., and 75° F. with the A columns depicting the polysaccharide emulsion and the B column depicting the methyl ethyl cellulose containing emulsion.

TABLE

| | Emulsion Whipping Temperature, °F. | | | | | | | |
|---|---|---|---|---|---|---|---|---|
| | 50 | | 65 | | 70 | | 75 | |
| | A | B | A | B | A | B | A | B |
| Pourable | No | Slightly | No | Yes | No | Yes | No | Yes. |
| Peak Character | Stiff | Stiff | Stiff | Soft | Stiff | Very Stiff | Stiff | No Peak. |

In the table, it is noted that the polysaccharide containing whipped product was non-pourable and stiff peaked when the aqueous emulsions were whipped at 50° F., 65° F., 70° F., and 75° F. The methyl ethyl cellulose product on the other hand was slightly pourable at 50° F. and pourable at temperatures of 65° F. and greater. The aforementioned polysaccharide whipped products were of a smooth and creamy consistency.

Stability tests were conducted on the whipped methyl ethyl cellulose containing emulsion and the polysaccharide emulsion. The respective emulsions, having a temperature of about 50° F., were whipped in a standard mixing bowl in a standard household mixer operated at a standard whipping speed for 90 seconds. The resultant whipped products were then refrigerated at 43° F. After two hours of refrigeration, a pronounced water layer was discernible in the whipped methyl ethyl cellulose emulsion i.e., syneresis). The polysaccharide product maintained its identity after 48 hours with no evidence of syneresis.

What is claimed is:
1. An edible emulsion adapted to provide an aerated food product of a smooth, creamy consistency, said emulsion comprising 100 parts by weight water and a water-soluble polysaccharide consisting essentially of a polymeric chain of D-glucopyranose units contiguously attached to one another by a beta 1,3 linkage to form a polymeric chain, said polymeric chain having D-glucopyranose groups contiguously attached to the polymeric chain through a beta 1,6 linkage, said polysaccharide being present in the emulsion in an amount ranging from about 0.01 to less than 0.5 part by weight polysaccharide for each 100 parts by weight water, said emulsion containing in addition to the polysaccharide and water a glyceride fat in an amount ranging from about 25 to about 100 parts by weight fat for each 100 parts by weight water with the polysaccharide being further characterized as a polymeric chain consisting essentially of the following units:

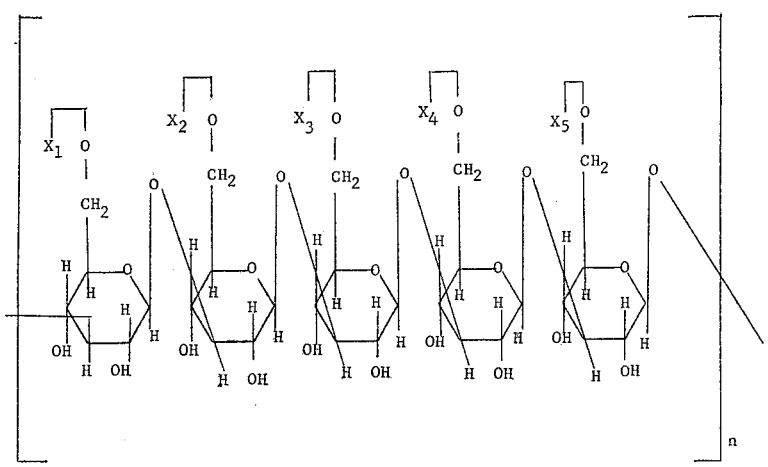

wherein $X_1$, $X_2$, $X_3$, $X_4$ and $X_5$ are selected from the group consisting of hydrogen and a glucopyranose group having the structure:

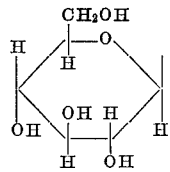

$n$ is an integer sufficient to provide a polysaccharide having an average molecular weight of at least 19,000 and at least one member of $X_1$, $X_2$, $X_3$, $X_4$ and $X_5$ is a D-glucopyranose group.

2. An edible homogenous emulsion according to claim 1 wherein from about 25 percent to about 75 percent of the D-glucopyranose units in the polymeric chain have appendant glucopyranose groups.

3. The edible emulsion according to claim 2 wherein the amount of polysaccharide ranges from about 0.05 to about 0.4 part by weight polysaccharide for each 100 parts by weight water and the glyceride fat has a Wiley melting point ranging from about 85° F. to about 120° F.

4. The edible emulsion according to claim 3 wherein the degree of substitution of appendant glucopyranose groups in the polymeric chain ranges from about 30 percent to 40 percent and $n$ is a value sufficient to provide an average molecular weight of at least 50,000.

5. The edible emulsion according to claim 4 wherein the fat has a Wiley melting point ranging from about 90 to about 110° F.

6. The edible emulsion according to claim 5 wherein the amount of polysaccharide ranges from about 0.1 to about 0.3 part by weight polysaccharide for each 100 parts by weight water and the triglyceride fat has a Wiley melting point ranging from about 95° F. to about 105° F. and said fat is present in the emulsion in an amount ranging from about 35 to about 80 parts by weight fat for each 100 parts by weight water.

7. The edible emulsion according to claim 2 wherein the emulsion contains an effective amount of at least one edible surface active agent.

8. The edible emulsion according to claim 7 which contains an edible sweetening agent in an amount ranging from about 0.025 to about 200 parts by weight sweetening agent for each 100 parts by weight water.

9. The edible emulsion according to claim 8 wherein the sweentening agent is a sugar and said sugar is present in an amount ranging from about 10 to about 150 parts by weight sugar for each 100 parts by weight water.

10. The edible emulsion according to claim 8 wherein the sweetening agent is an artificial sweetening agent and said artificial sweetening agent is present in said emulsion in an amount ranging from about 0.025 to about 6 parts by weight artificial sweetening agent for each 100 parts by weight water.

11. The edible emulsion according to claim 10 wherein the amount of artificial sweetening agent ranges from about 0.1 to about 3 parts by weight artificial sweetening agent for each 100 parts by weight water.

12. The edible emulsion according to claim 7 wherein the edible emulsion contains a polyoxyethylene derivative of a partial ester of an edible glycol and a higher saturated fatty acid.

13. The edible emulsion according to claim 12 which in addition to the polyoxyethylene derivative contains an acetylated monoglyceride.

14. The edible emulsion according to claim 13 wherein the polyoxyethylene derivative of a partial ester of an edible glycol and a higher saturated fatty acid is polyoxyethylene sorbitan tristearate.

References Cited

UNITED STATES PATENTS

| | | | |
|---|---|---|---|
| 2,913,342 | 11/1959 | Cameron et al. | 99—139 |
| 3,295,986 | 1/1967 | Saslaw et al. | 99—139 |
| 3,301,848 | 1/1967 | Halleck | 99—129 XR |

MAURICE W. GREENSTEIN, Primary Examiner

J. M. HUNTER, Assistant Examiner